UNITED STATES PATENT OFFICE.

THOMAS B. ALDRICH, OF DETROIT, MICHIGAN, ASSIGNOR TO PARKE, DAVIS & COMPANY, OF DETROIT, MICHIGAN, A CORPORATION OF MICHIGAN.

BENZOIC-ACID ESTERS OF TRIBROMOTERTIARY BUTYL ALCOHOL.

1,397,913. Specification of Letters Patent. Patented Nov. 22, 1921.

No Drawing. Application filed May 18, 1918. Serial No. 235,344.

*To all whom it may concern:*

Be it known that I, THOMAS B. ALDRICH, a citizen of the United States of America, residing at Detroit, in the county of Wayne and State of Michigan, have invented certain new and useful Improvements in Benzoic-Acid Esters of Tribromotertiary-Butyl Alcohol, of which the following is a specification.

The invention relates to a new series of bodies which may be designated as esters of tribromotertiary-butyl-alcohol, and the characteristic feature of the series is the combination of a benzoyl group with tribromotertiary-butyl-alcohol. As representative of the series I shall describe specifically the benzoic acid ester of tribromotertiary-butyl-alcohol, which may be formed as follows:

One part of tribromotertiary-butyl-alcohol (suitably dehydrated) is heated on a steam bath with one part of benzoyl chlorid for several hours, or until hydrochloric acid gas ceases to be given off, the reaction being as follows:

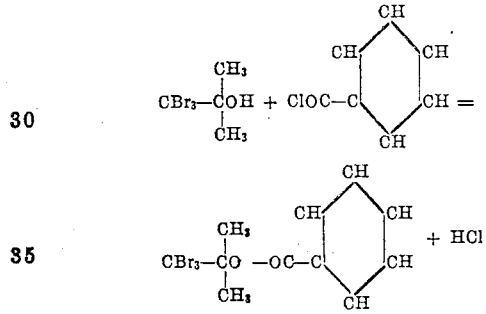

As soon as the reaction is completed, water is added and the ester thrown out in the form of an oil which solidifies on cooling. The supernatant liquid is then decanted as closely as possible, an excess of caustic soda (5 to 10%) is added, and the vessel heated on a steam bath for about half an hour to decompose or render soluble any of the uncombined ingredients. The solid product is then ground to a fine powder, placed on a suction filter and washed a number of times with cold water, after which it may be purified by dissolving in alcohol and recrystallizing.

The benzoic acid ester of tribromotertiary-butyl-alcohol may be graphically represented as follows:

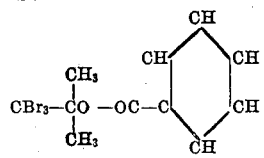

and has the following characteristics: It is in the form of white crystals (monoclinic) having a melting point of about 89° C., is readily soluble in organic solvents and practically insoluble in water, is not readily saponified, but on boiling with alkali (caustic soda 10%) decomposes gradually, does not readily decompose by boiling with concentrated nitric acid, is not volatile in air but is slightly volatile with steam.

Other bodies belonging to the same series may be formed by substitutions in the benzoyl group, such for instance as the nitro benzoic ester of tribromotertiary-butyl-alcohol.

What I claim as my invention is:

1. A new body forming one of a series, which may be designated as benzoic acid ester of tribromotertiary-butyl-alcohol, and characterized by the combination of tribromotertiary-butyl-alcohol and a substance containing the acyl benzoyl group and having the following characteristics: relative stability, insolubility in water and extreme solubility in organic solvents.

2. The new body, benzoic acid ester of tribromotertiary-butyl-alcohol, having the following characteristics: It is in the form of white crystals having a melting point of 89° C., is readily soluble in organic solvents and practically insoluble in water, is not readily saponified, but on boiling with alkali decomposes gradually, does not readily decompose by boiling with concentrated nitric acid, is not volatile in air but is slightly volatile with steam.

In testimony whereof I affix my signature.

THOMAS B. ALDRICH.